US012750579B2

(12) United States Patent
Chen

(10) Patent No.: US 12,750,579 B2
(45) Date of Patent: Sep. 29, 2026

(54) ELECTRONIC DEVICE AND INTEGRATED CAMERA THEREOF

(71) Applicant: AZUREWAVE TECHNOLOGIES, INC., New Taipei City (TW)

(72) Inventor: Ju-Hung Chen, New Taipei City (TW)

(73) Assignee: AZUREWAVE TECHNOLOGIES, INC., New Taipei City (TW)

( * ) Notice: Subject to any disclaimer, the term of this patent is extended or adjusted under 35 U.S.C. 154(b) by 0 days.

(21) Appl. No.: 19/196,911

(22) Filed: May 2, 2025

(65) Prior Publication Data

US 2026/0189776 A1 Jul. 2, 2026

(30) Foreign Application Priority Data

Jan. 2, 2025 (TW) ................................ 114100011

(51) Int. Cl.
*H04N 23/57* (2023.01)
*H04N 23/52* (2023.01)

(52) U.S. Cl.
CPC ............ *H04N 23/57* (2023.01); *H04N 23/52* (2023.01)

(58) Field of Classification Search
CPC ............................... H04N 23/57; H04N 23/52
USPC .......................................................... 348/374
See application file for complete search history.

(56) References Cited

FOREIGN PATENT DOCUMENTS

| | | | | |
|---|---|---|---|---|
| JP | 2001136026 | A | 5/2001 | |
| JP | 201285262 | A | 4/2012 | |
| JP | 2021122150 | A | 8/2021 | |
| TW | M671291 | U | 6/2025 | |
| WO | WO-2020101043 | A1 * | 5/2020 | .............. H01Q 1/24 |

* cited by examiner

*Primary Examiner* — Joel W Fosselman
(74) *Attorney, Agent, or Firm* — Li & Cai Intellectual Property (USA) Office

(57) ABSTRACT

An integrated camera of an electronic device includes an elongated circuit board, a camera module, a first frequency adjustment component, a first metal layer, and a first grounding component. The elongated circuit board has a camera distribution segment and a first antenna distribution segment. The camera module is assembled to the camera distribution segment. The first frequency adjustment component is connected to a first grounding portion of the camera module. The first metal layer is formed on the first antenna distribution segment, and has a first common ground end connected to the first grounding portion and a first grounding end arranged away from the first common ground end. The first metal layer has a first inner slot that is arranged between the first common ground end and the first grounding end and that has two openings. The first grounding component is connected to the first grounding end.

11 Claims, 11 Drawing Sheets

ELECTRONIC DEVICE AND INTEGRATED CAMERA THEREOF

CROSS-REFERENCE TO RELATED PATENT APPLICATION

This application claims the benefit of priority to Taiwan Patent Application No. 114100011, filed on Jan. 2, 2025. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a camera, and more particularly to an electronic device and an integrated camera thereof each having an antenna function.

BACKGROUND OF THE DISCLOSURE

A camera and an antenna provided in a conventional electronic device are designed to be independent from each other, such that the camera and the antenna need to occupy more interior space of the conventional electronic device, and need to have a clearance region therebetween. Accordingly, the layout and the design of the antenna are limited because the antenna needs to be arranged on a remaining region available in the conventional electronic device, which usually has an irregular shape.

SUMMARY OF THE DISCLOSURE

In response to the above-referenced technical inadequacies, the present disclosure provides an electronic device and an integrated camera thereof for effectively improving on the issues associated with conventional electronic devices.

In order to solve the above-mentioned problems, one of the technical aspects adopted by the present disclosure is to provide an electronic device, which includes a display, an integrated camera, and a first cable. The display has a first long edge and a second long edge that is parallel to the first long edge. The display includes a grounding region and a first signal-permeable region that is arranged along the first long edge. The integrated camera is disposed in the display and includes an elongated circuit board, a camera module, a first frequency adjustment component, a first metal layer, and a first grounding component. The elongated circuit board is arranged along and adjacent to the first long edge of the display. The elongated circuit board has a camera distribution segment and a first antenna distribution segment that is connected to one end of the camera distribution segment and that faces toward the first signal-permeable region. The camera module is assembled to the camera distribution segment and has a first grounding portion. The first frequency adjustment component is connected to the first grounding portion and the grounding region. The first metal layer is formed on the first antenna distribution segment. The first metal layer has a first common ground end connected to the first grounding portion and a first grounding end that is arranged away from the first common ground end. The first metal layer has a first inner slot that is arranged between the first common ground end and the first grounding end and that has a first open circuit opening and a first communication opening. The first grounding component is connected to the first grounding end and the grounding region. The grounding region, the first grounding portion, the first frequency adjustment component, the first metal layer, and the first grounding component jointly define a first outer slot that is in spatial communication with the first inner slot through the first communication opening so as to jointly form a first slot antenna. The first cable is disposed in the display and includes a first feeding wire and a first outer conductor. The first feeding wire is connected to the display and the first common ground end. The first outer conductor surrounds the first feeding wire and is connected to the first grounding end. The first slot antenna is configured to generate a signal resonance in a first frequency or a second frequency that is higher than the first frequency.

In order to solve the above-mentioned problems, another one of the technical aspects adopted by the present disclosure is to provide an integrated camera of an electronic device, which includes an elongated circuit board, a camera module, a first frequency adjustment component, a first metal layer, and a first grounding component. The elongated circuit board has a camera distribution segment and a first antenna distribution segment that is connected to one end of the camera distribution segment. The camera module is assembled to the camera distribution segment and has a first grounding portion. The first frequency adjustment component is connected to the first grounding portion. The first metal layer is formed on the first antenna distribution segment. The first metal layer has a first common ground end connected to the first grounding portion and a first grounding end that is arranged away from the first common ground end. The first metal layer has a first inner slot that is arranged between the first common ground end and the first grounding end and that has a first open circuit opening and a first communication opening. The first grounding component is connected to the first grounding end.

Therefore, the camera module and the first metal layer of any one of the electronic device and the integrated camera provided by the present disclosure are jointly arranged on the elongated circuit board, commonly grounded, and further in cooperation with the first frequency adjustment component and the first grounding component for jointly forming the first slot antenna, so that the camera module and the first metal layer do not need to have a clearance region therebetween, thereby effectively reducing an overall size of the integrated camera and improving a layout and a design of the first slot antenna.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
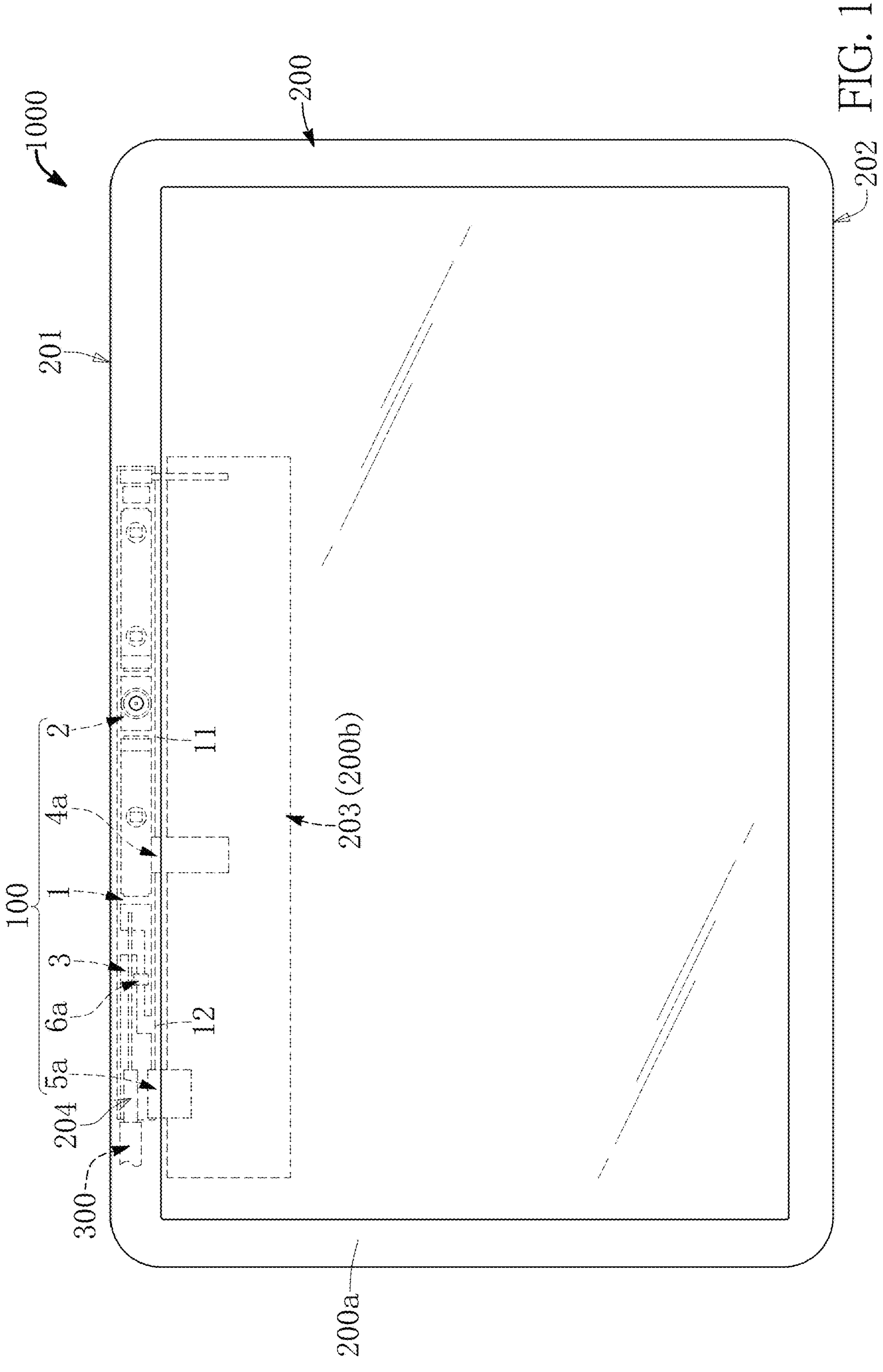
FIG. 1 is a schematic view of an electronic device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 6, a first embodiment of the present disclosure is provided. As shown in FIG. 1 to FIG. 5, the present embodiment provides an electronic device 1000, which includes a display 200, an integrated camera 100 disposed in the display 200, and a first cable 300 that is electrically coupled to the display 200 and the integrated camera 100. It should be noted that the electronic device 1000 shown in FIG. 1 of the present embodiment is a tablet computer, and the integrated camera 100 is in cooperation with the display 200 and the first cable 300, but the present disclosure is not limited thereto.

For example, in other embodiments of the present disclosure not shown in the drawings, the integrated camera 100 can be independently used (e.g., sold) or can be used in cooperation with other components (e.g., the integrated camera 100 can be applied to a smart doorbell, a wearable camera, or a smart glasses). The following description describes the structure and connection relationship of each component of the electronic device 1000.

The display 200 has a substantial rectangular shape and has a first long edge 201 and a second long edge 202 that is parallel to the first long edge 201. The display 200 includes a grounding region 203 and a first signal-permeable region 204 that is arranged along the first long edge 201, and a specific structure of the display 200 in the present embodiment can be changed or adjusted according to practical requirements.

Figure 2:
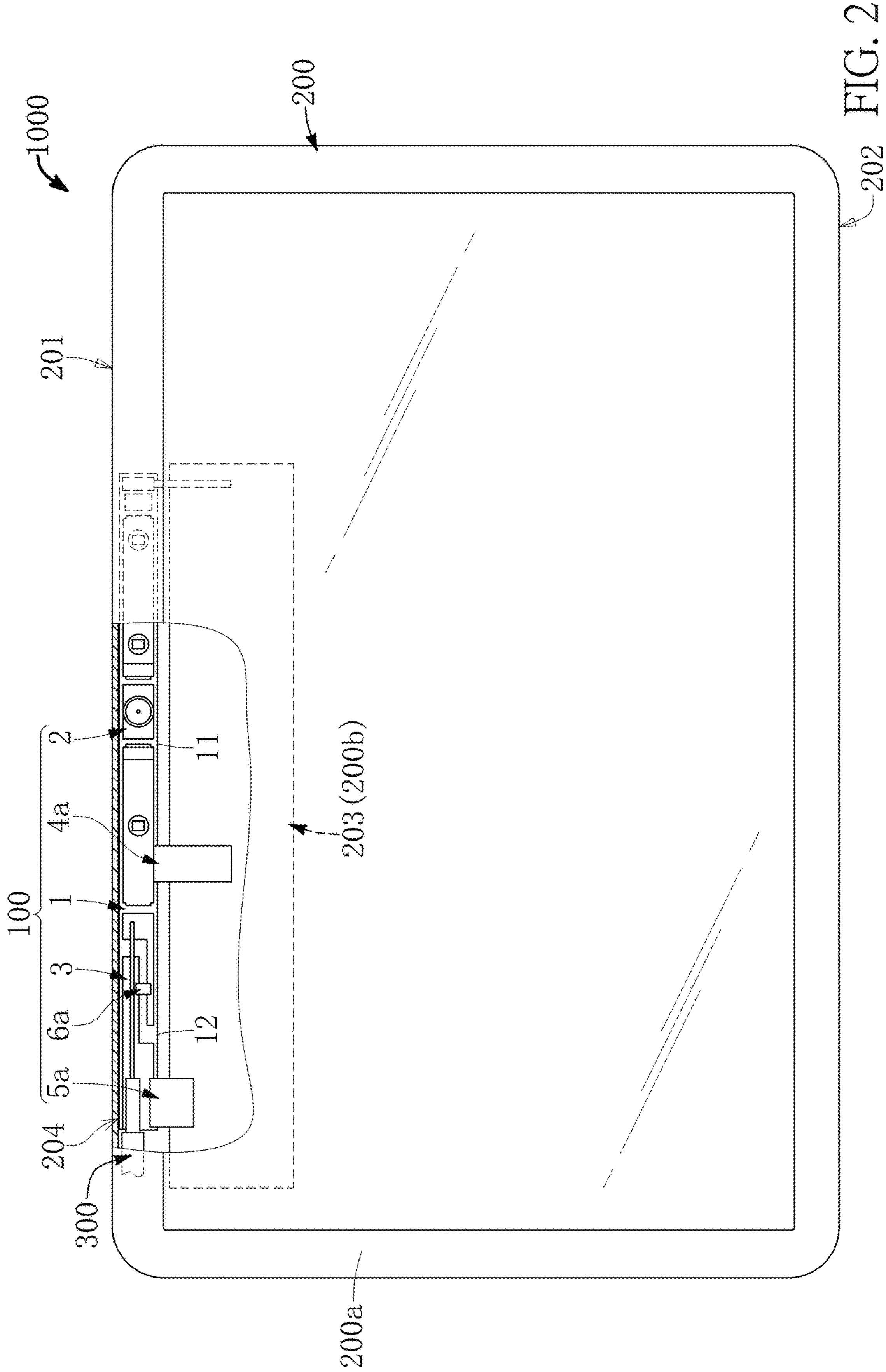
FIG. 2 is a schematic cross-sectional view of FIG. 1.
Figure 3:
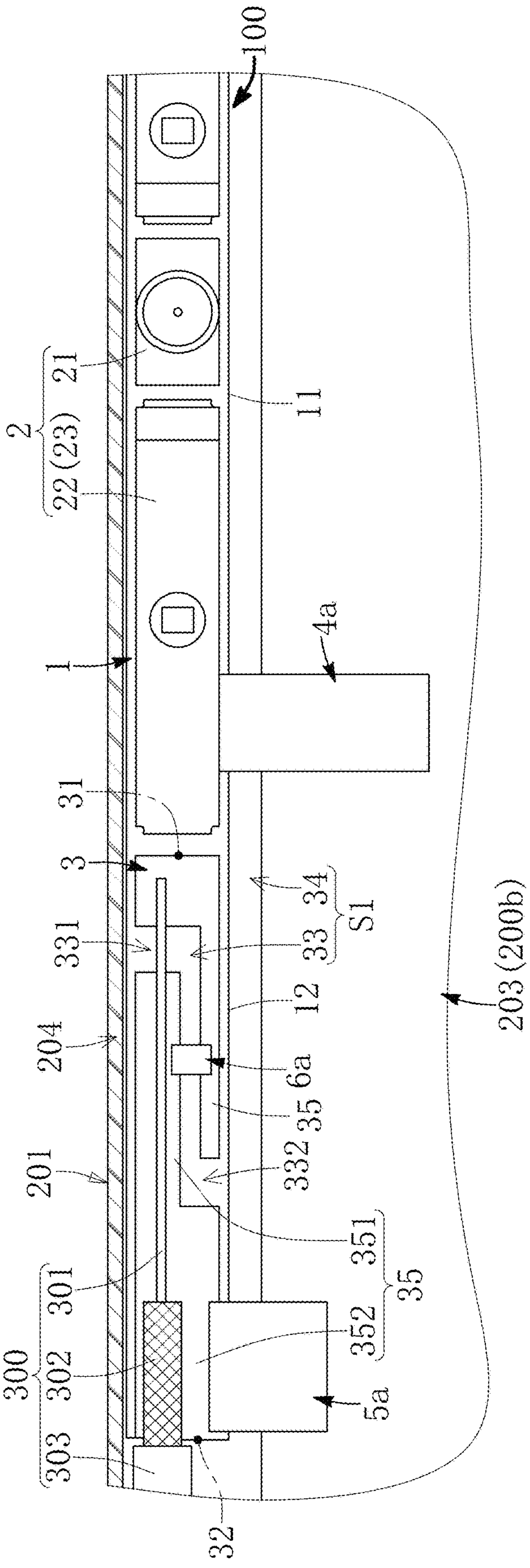
FIG. 3 is a schematic enlarged view of FIG. 2.
Figure 4:
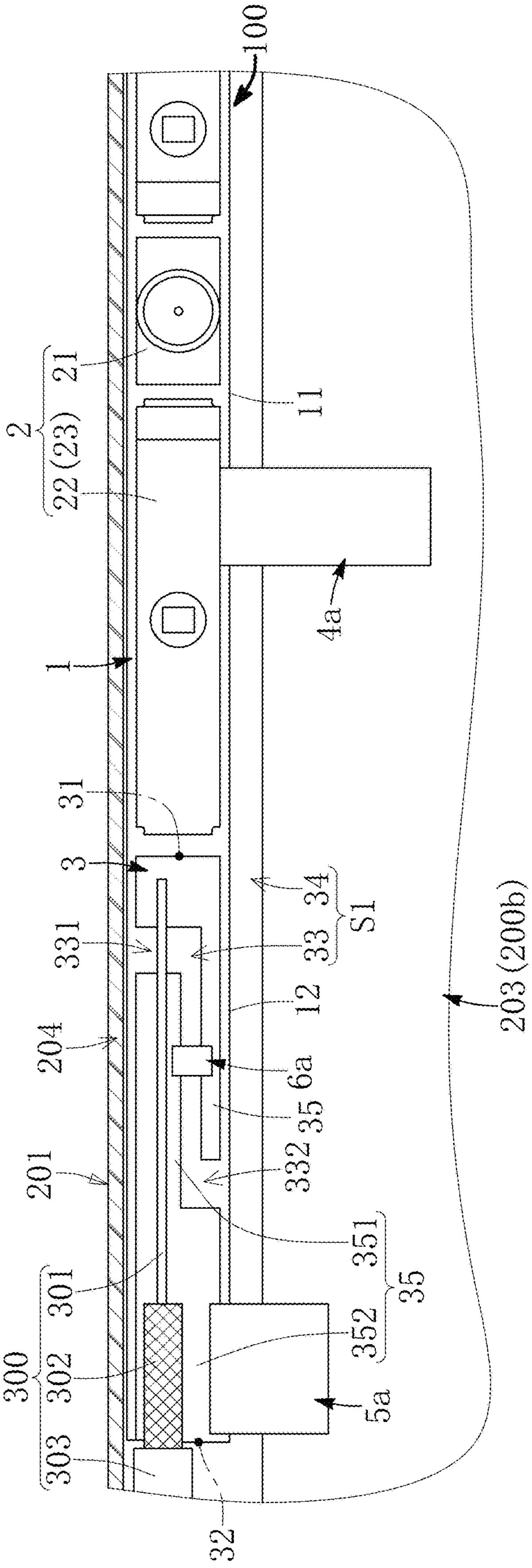
FIG. 4 is a schematic enlarged view showing a variation of the electronic device of FIG. 3.
Figure 5:
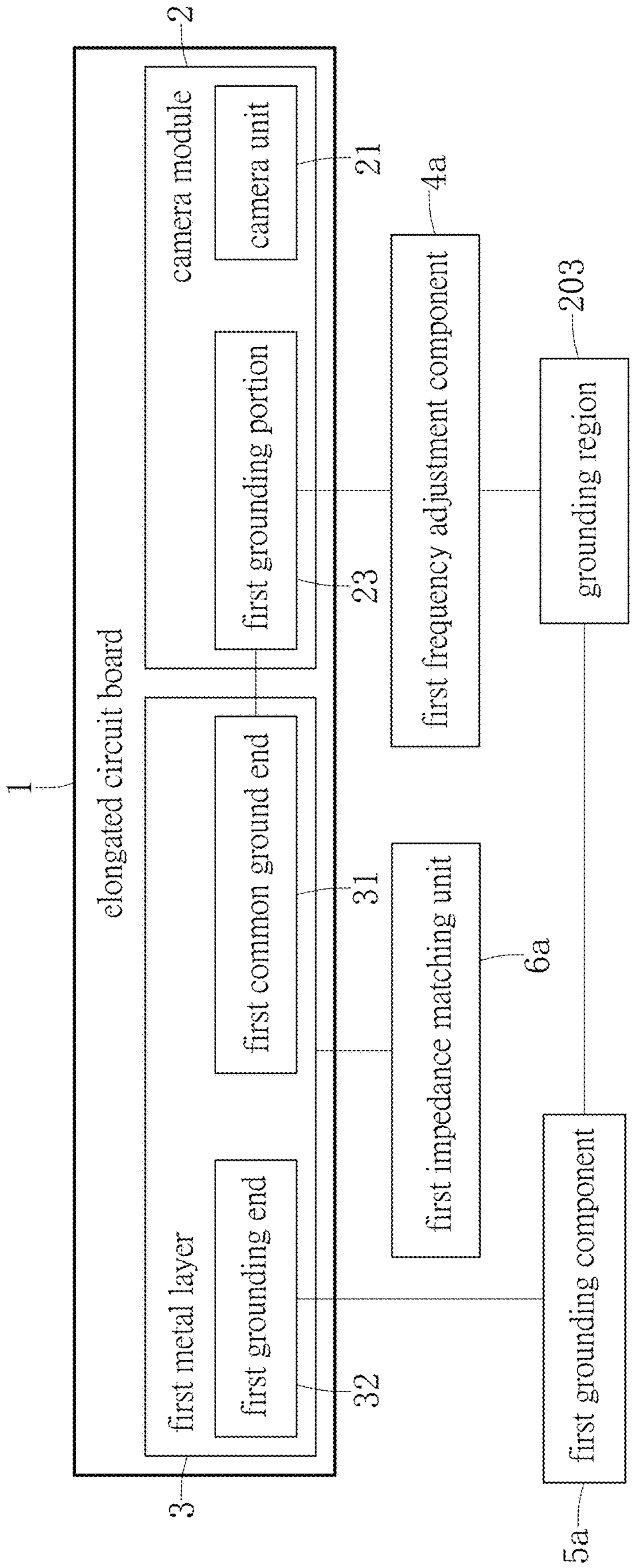
FIG. 5 is a functional block diagram of the electronic device according to the first embodiment of the present disclosure.

For example, as shown in FIG. 1 and FIG. 2, the display 200 can include a plastic housing 200*a* and a metal component 200*b* (e.g., a copper foil) that is disposed in the plastic housing 200*a*, the grounding region 203 is arranged on the metal component 200*b*, and the first signal-permeable region 204 is arranged on the plastic housing 200*a*. Or, in other embodiments of the present disclosure not shown in the drawings, the display 200 can include a metal housing and a plastic window that is arranged on the metal housing, the grounding region 203 is arranged on the metal housing, and the first signal-permeable region 204 is arranged on the plastic window.

As shown in FIG. 1 to FIG. 5, the integrated camera 100 in the present embodiment includes an elongated circuit board 1, a camera module 2 assembled to the elongated circuit board 1, a first frequency adjustment component 4*a* connected to the elongated circuit board 1, a first metal layer 3 formed on the elongated circuit board 1, a first grounding component 5*a* connected to the first metal layer 3, and a first impedance matching unit 6*a* that is assembled to the first metal layer 3, but the present disclosure is not limited thereto. For example, in other embodiments of the present disclosure not shown in the drawings, the first impedance matching unit 6*a* of the integrated camera 100 can be omitted according to practical requirements.

In the present embodiment, the elongated circuit board 1 is arranged along and adjacent to the first long edge 201 of the display 200. In other words, the elongated circuit board 1 is substantially parallel to the first long edge 201 and is arranged adjacent to the grounding region 203. The elongated circuit board 1 has a camera distribution segment 11 and a first antenna distribution segment 12 that is connected to one end of the camera distribution segment 11 and that faces toward the first signal-permeable region 204.

The camera module 2 is assembled to the camera distribution segment 11 and includes a camera unit 21 and a shielding case 22. The camera unit 21 substantially corresponds in position to a central portion of the first long edge 201, and the shielding case 22 is configured to cover electronic components (not shown in the drawings) arranged inside thereof.

In the present embodiment, the camera module 2 further includes a first grounding portion 23. The first grounding portion 23 can be any grounding structure that is disposed on the camera distribution segment 11 and that is arranged adjacent to the first antenna distribution segment 12. For example, the first grounding portion 23 can include the shielding case 22 and a grounding conductor connected to the shielding case 22. The camera module 2 can be electrically coupled to the grounding region 203 through the first grounding portion 23 and the first frequency adjustment component 4*a*. For example, the first frequency adjustment component 4*a* can be a copper foil connected to the first grounding portion 23 and the grounding region 203.

The first metal layer 3 is formed on the first antenna distribution segment 12, and the first metal layer 3 and the camera module 2 can be located on a same surface of the elongated circuit board 1, but the present disclosure is not limited thereto. For example, in other embodiments of the present disclosure not shown in the drawings, the first metal layer 3 and the camera module 2 can be respectively located on two opposite surfaces of the elongated circuit board 1.

Specifically, the first metal layer 3 has a first common ground end 31 connected to the first grounding portion 23 and a first grounding end 32 that is arranged away from the first common ground end 31. The connection manner between the first common ground end 31 and the first grounding portion 23 can be adjusted or changed according to practical requirements, and the present disclosure is not limited by the present embodiment.

The first metal layer 3 has a first inner slot 33 that is arranged between the first common ground end 31 and the first grounding end 32 and that has a first open circuit opening 331 and a first communication opening 332. The first open circuit opening 331 is arranged adjacent to the first common ground end 31, and the first communication opening 332 is arranged adjacent to the first grounding end 32, but the present disclosure is not limited thereto.

In the present embodiment, the first metal layer 3 can include two L-shaped radiation segments 35. Each of the two L-shaped radiation segments 35 has a long sub-segment 351 and a short sub-segment 352 that is perpendicularly connected to the long sub-segment 351, and the two L-shaped radiation segments 35 are in a staggered arrangement. For example, the long sub-segment 351 of any one of the two L-shaped radiation segments 35 is arranged inside of another one of the two L-shaped radiation segments 35, and the short sub-segments 352 of the two L-shaped radiation segments 35 are arranged away from each other.

In the present embodiment, the short sub-segments 352 of the two L-shaped radiation segments 35 respectively have the first common ground end 31 and the first grounding end 32. One of the two L-shaped radiation segments 35 having the first common ground end 31 and the long sub-segment 351 of another one of the two L-shaped radiation segments 35 jointly define the first open circuit opening 331. Furthermore, one of the two L-shaped radiation segments 35 having the first grounding end 32 and the long sub-segment 351 of another one of the two L-shaped radiation segments 35 jointly define the first communication opening 332.

The first grounding component 5*a* (e.g., a copper foil) is connected to the first grounding end 32 and the grounding region 203, so that the grounding region 203, the first grounding portion 23, the first frequency adjustment component 4*a*, the first metal layer 3, and the first grounding component 5*a* jointly define a first outer slot 34. Moreover, the first outer slot 34 is in spatial communication with the first inner slot 33 through the first communication opening 332 so as to jointly form a first slot antenna S1.

The first cable 300 is disposed in the display 200, and the first cable 300 includes a first feeding wire 301, a first outer conductor 302 surrounding the first feeding wire 301, and a first insulating sleeve 303 that surrounds the outer conductor 302. The first feeding wire 301 and the first outer conductor 302 in the present embodiment are isolated from each other in an insulation manner (not shown in the drawings). The first feeding wire 301 is connected to the display 200 and the first common ground end 31, and the outer conductor 302 is connected to the first grounding segment 32. Accordingly, the first slot antenna S1 is configured to (selectively) generate a signal resonance in a first frequency or a second frequency that is higher than the first frequency.

The first impedance matching unit 6*a* (e.g., a capacitor and/or an inductor) is disposed across a portion of the first inner slot 33 that is between the first open circuit opening 331 and the first communication opening 332 (e.g., the first impedance matching unit 6*a* is bridged on the long sub-segments 351 of the two L-shaped radiation segments 35), thereby optimizing the bandwidth and efficiency of the first slot antenna S1.

In summary, the camera module 2 and the first metal layer 3 of the electronic device 1000 in the present embodiment are jointly arranged on the elongated circuit board 1, commonly grounded, and further in cooperation with the first frequency adjustment component 4*a* and the first grounding component 5*a* for jointly forming the first slot antenna S1, so that the camera module 2 and the first metal layer 3 do not need to have a clearance region therebetween, thereby effectively reducing an overall size of the integrated camera 100 and improving a layout and a design of the first slot antenna S1.

Specifically, the electronic device 1000 in the present embodiment is provided with the first slot antenna S1 having a meandering shape through a cooperation of multiple components therein, thereby effectively resisting a proximity signal interference. Moreover, the first frequency adjustment component 4*a* is selectively connected to one of different positions of the first grounding portion 23 according to the first frequency or the second frequency so as to adjust a distance between the first frequency adjustment component 4*a* and the first common ground end 31, thereby effectively changing a length and a frequency band of the first slot antenna S1 in operation.

Figure 6:
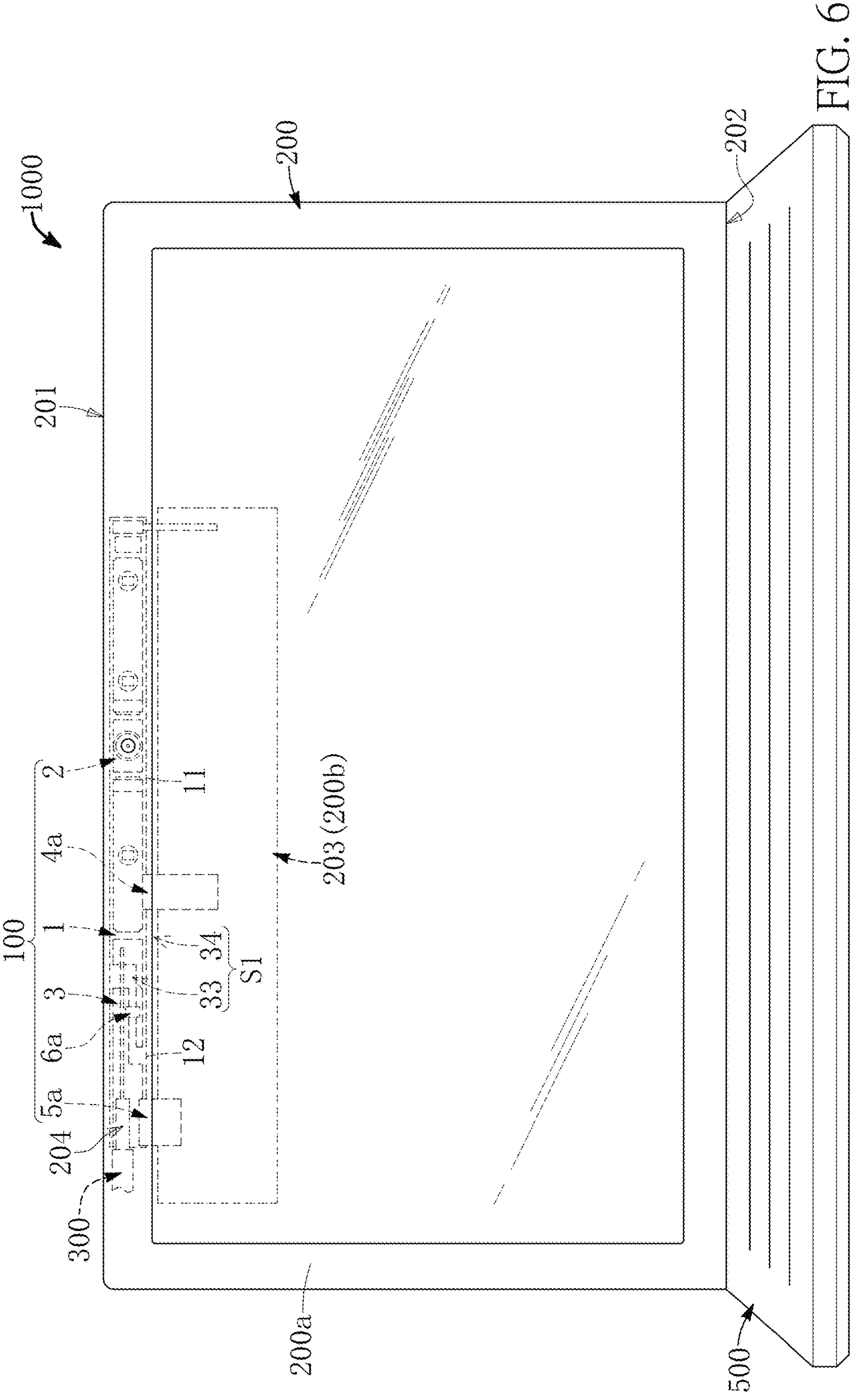
FIG. 6 is a schematic view showing the electronic device in another configuration according to the first embodiment of the present disclosure.

It should be noted that the electronic device 1000 shown in FIG. 1 to FIG. 5 of the present embodiment is the tablet computer, but the present disclosure is not limited thereto. As shown in FIG. 6, the electronic device 1000 can be a notebook computer including an input host 500 (e.g., a keyboard module), thereby effectively reducing an interference that may affect the first slot antenna S1 of the integrated camera 100.

Second Embodiment

Figure 7:
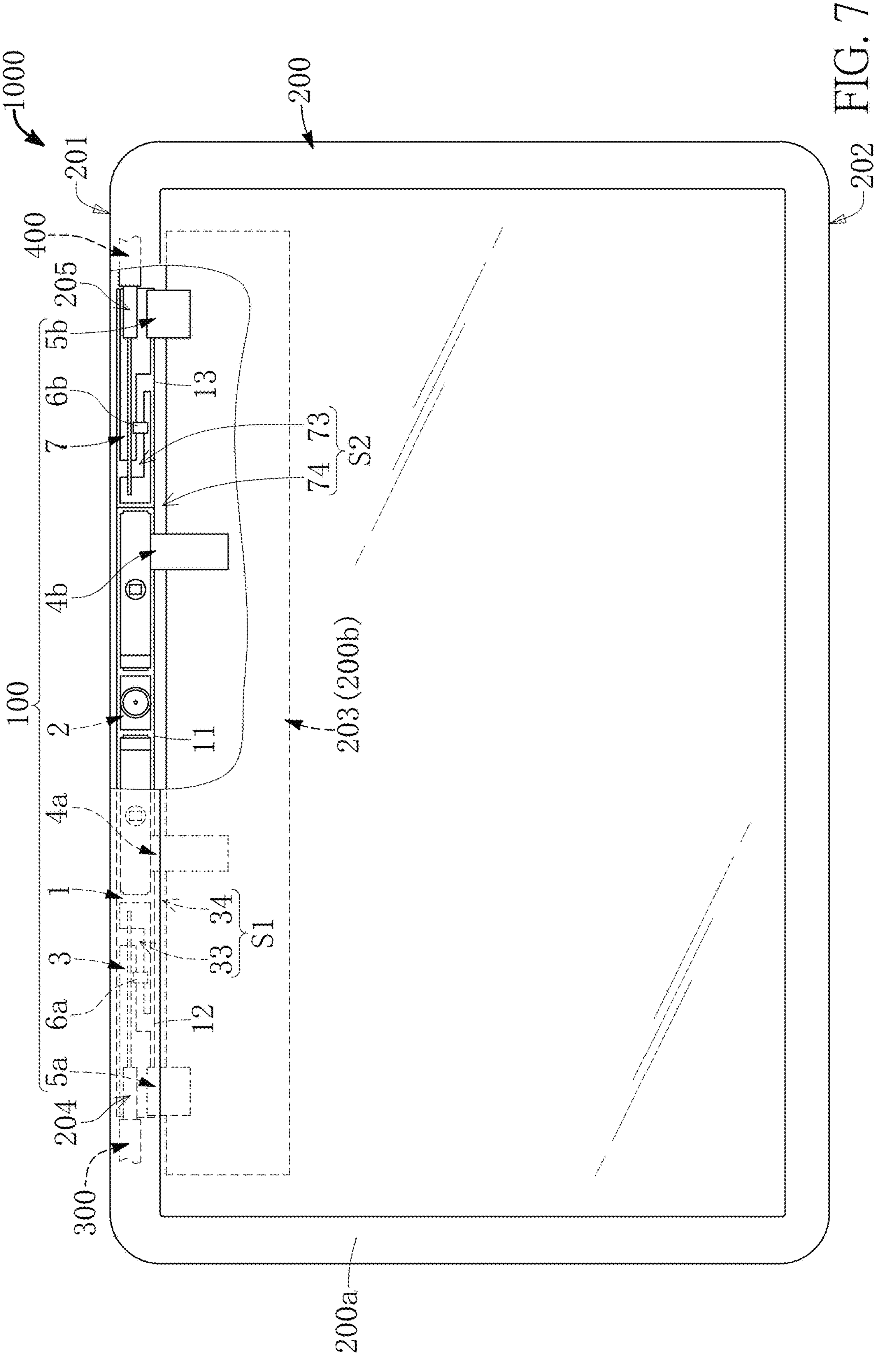
FIG. 7 is a schematic cross-sectional view of the electronic device according to a second embodiment of the present disclosure.
Figure 8:
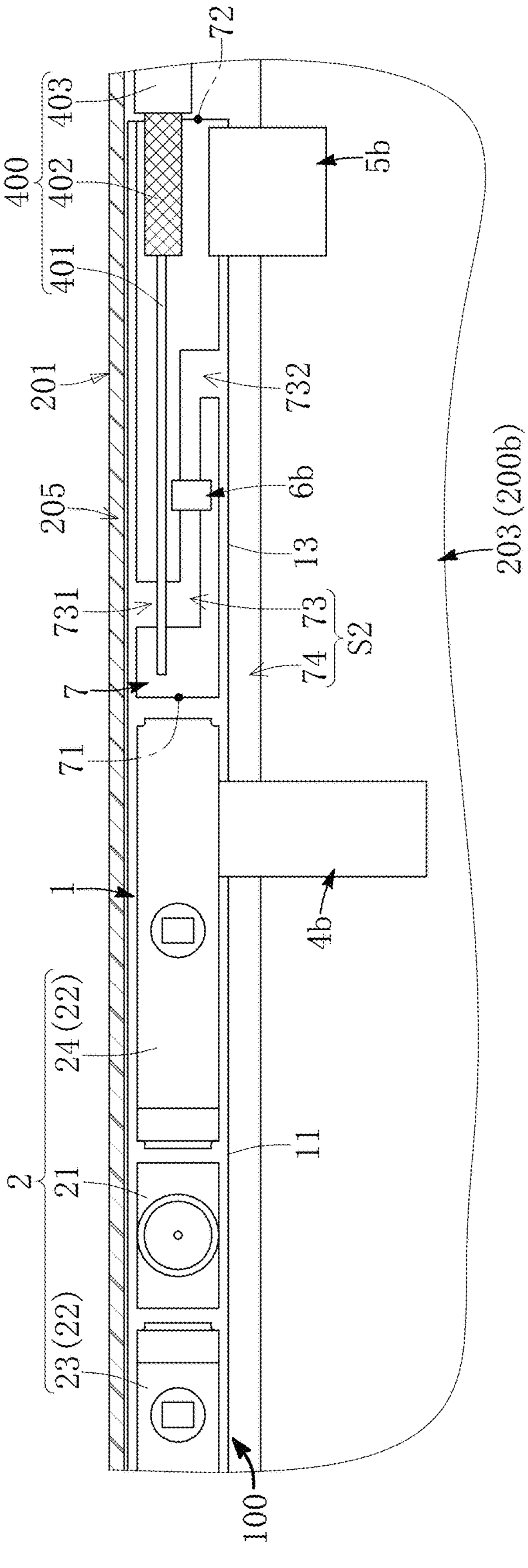
FIG. 8 is a schematic enlarged view of FIG. 7.
Figure 9:
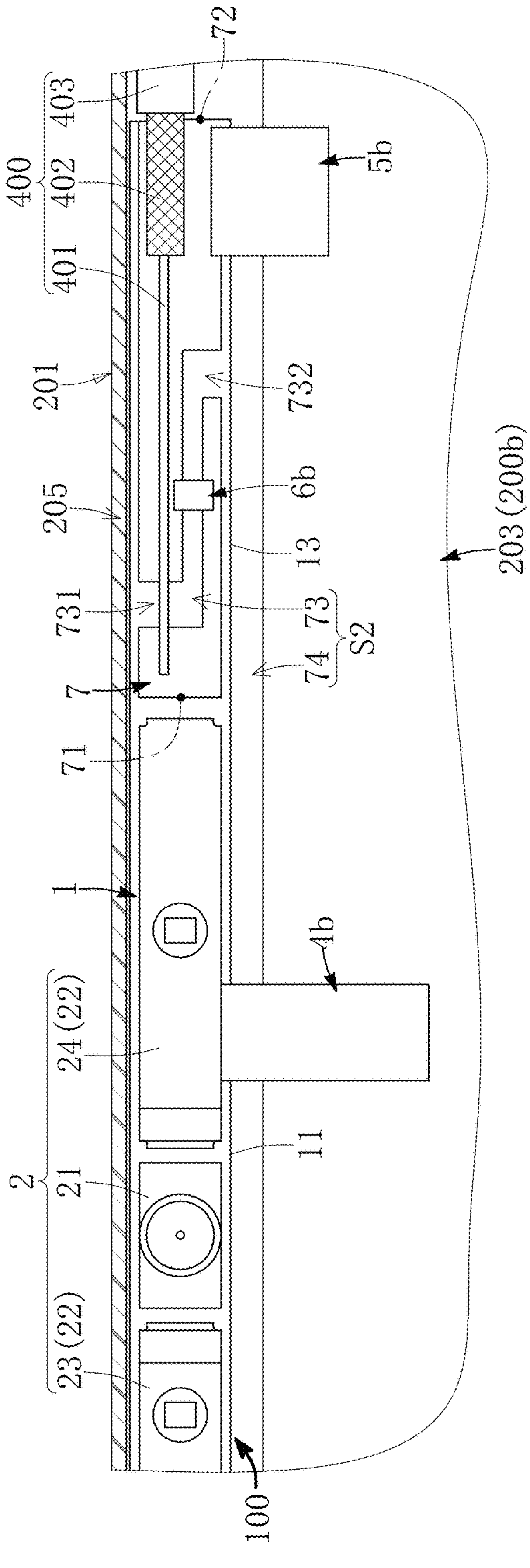
FIG. 9 is a schematic enlarged view showing a variation of the electronic device of FIG. 8.

Referring to FIG. 7 to FIG. 9, a second embodiment of the present disclosure, which is similar to the first embodiment of the present disclosure, is provided. For the sake of brevity, descriptions of the same components in the first and second embodiments of the present disclosure will be omitted herein, and the following description only discloses different features between the first and second embodiments.

In the present embodiment, the display 200 includes a second signal-permeable region 205, and the first signal-permeable region 204 and the second signal-permeable region 205 are arranged along the first long edge 201 and are respectively arranged on two opposite sides of the first long edge 201. It should be noted that the formation and the definition of the second signal-permeable region 205 are substantially identical to those of the first signal-permeable region 204 and will be not described in detail herein for the sake of brevity.

Moreover, the integrated camera 100 in the present embodiment is substantially a mirror-symmetrical structure, but the present disclosure is not limited thereto. The elongated circuit board 1 has a second antenna distribution segment 13 that is connected to another end of the camera distribution segment 11 and that faces toward the second signal-permeable region 205.

The camera module 2 has a second grounding portion 24, and the second grounding portion 24 can be any grounding structure that is disposed on the camera distribution segment 11 and that is arranged adjacent to the second antenna distribution segment 13. For example, the second grounding portion 24 can be arranged on a portion of the shielding case 22 adjacent to the second antenna distribution segment 13 and a grounding structure that is connected to the shielding case 22 according to design requirements, but the present disclosure is not limited thereto.

In addition, the integrated camera 100 of the present embodiment further includes a second frequency adjustment component 4*b*, a second metal layer 7, a second grounding component 5*b*, and a second impedance matching unit 6*b*. The second frequency adjustment component 4*b* is connected to the second grounding portion 24 and the grounding region 203, and the second frequency adjustment component 4*b* is selectively connected to one of different positions of the second grounding portion 24 (shown in FIG. 8 and FIG. 9) according to the first frequency or the second frequency, thereby adjusting a distance between the second frequency adjustment component 4*b* and the second metal layer 7 (e.g., a second common ground end 71 as described in the following description).

Moreover, the second metal layer 7 is formed on the second antenna distribution segment 13, and the second metal layer 7 has a second common ground end 71 connected to the second grounding portion 24 and a second grounding end 72 that is arranged away from the second common ground end 71. The second metal layer 7 has a second inner slot 73 that is arranged between the second common ground end 71 and the second grounding end 72 and that has a second open circuit opening 731 and a second communication opening 732.

The second grounding component 5*b* is connected to the second grounding end 72 and the grounding region 203, such that the grounding region 203, the second grounding portion 24, the second frequency adjustment component 4*b*, the second metal layer 7, and the second grounding component 5*b* jointly define a second outer slot 74. Moreover, the second outer slot 74 is in spatial communication with the second inner slot 73 through the second communication opening 732 so as to jointly form a second slot antenna S2.

The electronic device 1000 includes a second cable 400 disposed in the display 200. The second cable 400 includes a second feeding wire 401, an outer conductor 402 surrounding the second feeding wire 401, and a second insulating sleeve 403 that surrounds the outer conductor 402. The second feeding wire 401 and the second outer conductor 402 in the present embodiment are isolated from each other in an insulation manner (not shown in the drawings). The second feeding wire 401 is connected to the display 200 and the second common ground end 71, and the outer conductor 402 is connected to the second grounding end 72.

The second impedance matching unit 6*b* (e.g., a capacitor and/or an inductor) is disposed across a portion of the second inner slot 73 that is between the open circuit opening 731 and the second communication opening 732, but the present disclosure is not limited thereto. For example, in other embodiments of the present disclosure not shown in the drawings, the second impedance matching unit 6*b* can be omitted according to practical requirements.

The structure and connection relationship of the second slot antenna S2, the second frequency adjustment component 4*b*, and the second cable 400 in the present embodiment are substantially identical to those of the first slot antenna S1, the first frequency adjustment component 4*a*, and the first cable 300, and will be not described in detail herein for the sake of brevity.

Third Embodiment

Figure 10:
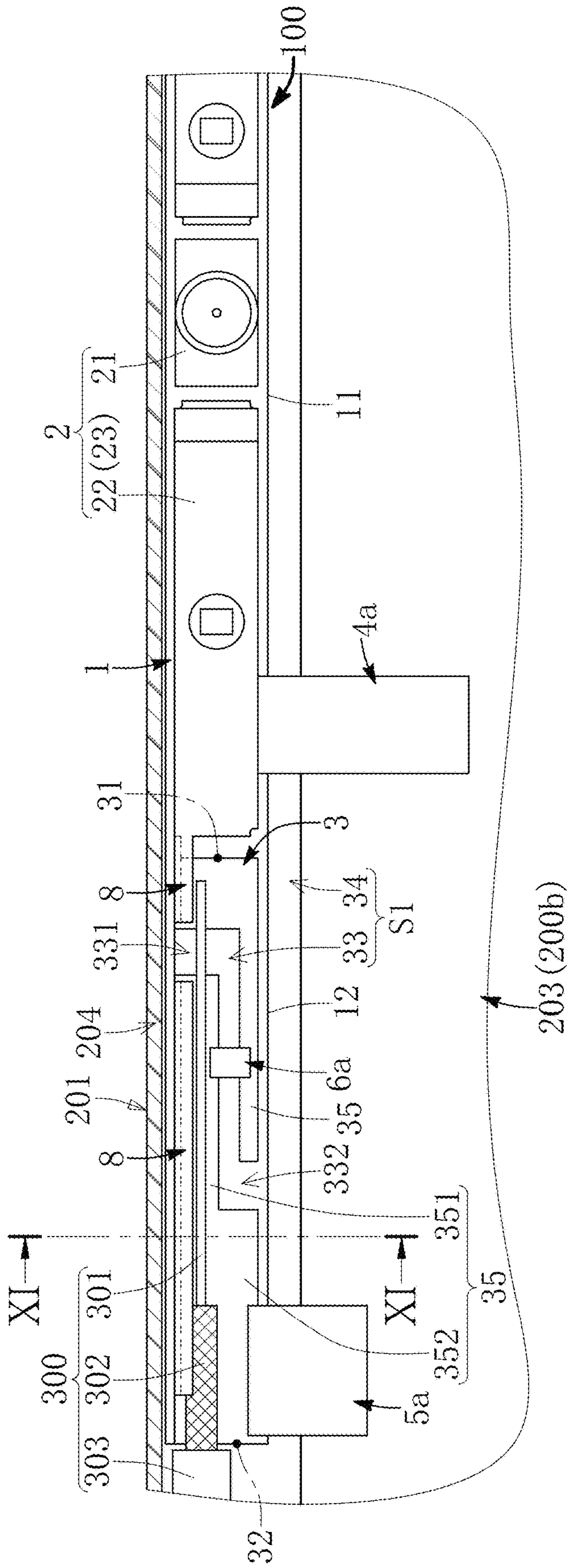
FIG. 10 is a schematic cross-sectional view showing a part of the electronic device according to a third embodiment of the present disclosure.
Figure 11:
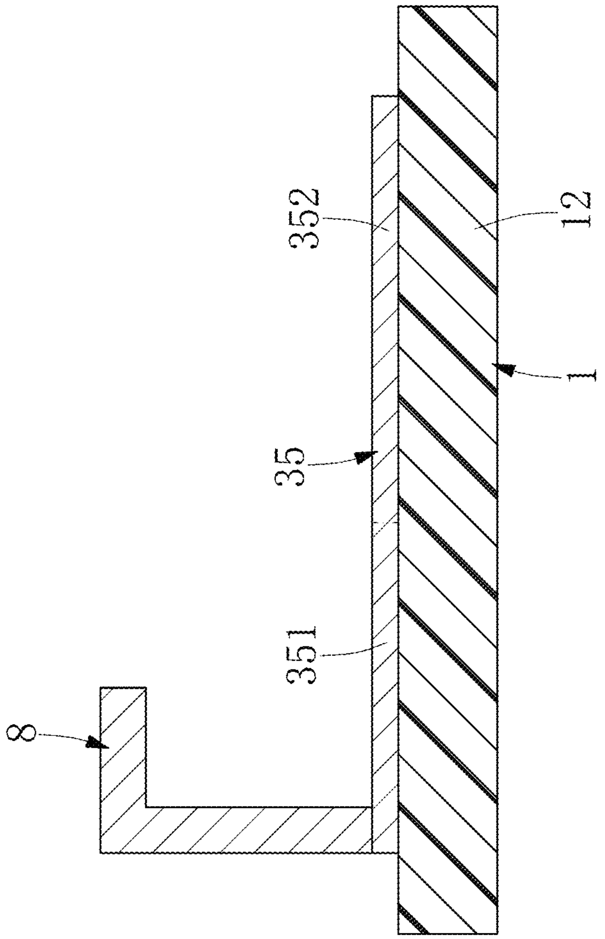
FIG. 11 is a schematic cross-sectional view taken along line XI-XI of FIG. 10.

Referring to FIG. 10 and FIG. 11, a third embodiment of the present disclosure, which is similar to the first embodiment of the present disclosure, is provided. For the sake of brevity, descriptions of the same components in the first and third embodiments of the present disclosure will be omitted herein, and the following description only discloses different features between the first and third embodiments.

In the present embodiment, the integrated camera 100 further includes two three-dimensional extension segments 8. The two three-dimensional extension segments 8 respectively extend from the two L-shaped radiation segments 35 in a direction away from the elongated circuit board 1, and the two three-dimensional extension segments 8 are spaced apart from each other at a position that corresponds to the first inner slot 33, thereby effectively increasing the radiation area of the first metal layer 3.

Specifically, the two three-dimensional extension segments 8 in the present embodiment can be formed by extending from the long sub-segment 351 and the short sub-segment 352 that are arranged away from the grounding region 203 and that respectively belong to the two L-shaped radiation segments 35, the two three-dimensional extension segments 8 are spaced apart from each other at a position that corresponds to the first open circuit opening 331, and the three-dimensional extension segment 8 extending from the short sub-segment 352 can be connected to the shielding case 22, but the present disclosure is not limited thereto. For example, in other embodiments of the present disclosure not shown in the drawings, the structures of the two three-dimensional extension segments 8 can be adjusted or changed according to practical requirements.

Beneficial Effects of the Embodiments

In conclusion, the camera module and the first metal layer of any one of the electronic device and the integrated camera provided by the present disclosure are jointly arranged on the elongated circuit board, commonly grounded, and further in cooperation with the first frequency adjustment component and the first grounding component for jointly forming the first slot antenna, so that the camera module and the first metal layer do not need to have a clearance region therebetween, thereby effectively reducing an overall size of the integrated camera and improving a layout and a design of the first slot antenna.

Specifically, the electronic device in the present disclosure is provided with the first slot antenna having a meandering shape through a cooperation of multiple components therein, thereby effectively resisting a proximity signal interference. Moreover, the first frequency adjustment component is selectively connected to one of different positions of the first grounding portion according to the first frequency or the second frequency so as to adjust a distance between the first frequency adjustment component and the first common ground end, thereby effectively changing a length and a frequency band of the first slot antenna in operation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:

a display having a first long edge and a second long edge that is parallel to the first long edge, wherein the display includes a grounding region and a first signal-permeable region that is arranged along the first long edge;

an integrated camera disposed in the display and including:

an elongated circuit board arranged along and adjacent to the first long edge of the display, wherein the elongated circuit board has a camera distribution segment and a first antenna distribution segment that is connected to one end of the camera distribution segment and that faces toward the first signal-permeable region;

a camera module being assembled to the camera distribution segment and having a first grounding portion;

a first frequency adjustment component connected to the first grounding portion and the grounding region;

a first metal layer formed on the first antenna distribution segment, wherein the first metal layer has a first common ground end connected to the first grounding portion and a first grounding end that is arranged away from the first common ground end, and wherein the first metal layer has a first inner slot that is arranged between the first common ground end and the first grounding end and that has a first open circuit opening and a first communication opening; and a first grounding component connected to the first grounding end and the grounding region, wherein the grounding region, the first grounding portion, the first frequency adjustment component, the first metal layer, and the first grounding component jointly define a first outer slot that is in spatial communication with the first inner slot through the first communication opening so as to jointly form a first slot antenna; and a first cable disposed in the display and including:

a first feeding wire connected to the display and the first common ground end; and a first outer conductor surrounding the first feeding wire and being connected to the first grounding end, wherein the first slot antenna is configured to generate a signal resonance in a first frequency or a second frequency that is higher than the first frequency.

2. The electronic device according to claim 1, wherein the first frequency adjustment component is selectively connected to one of different positions of the first grounding portion according to the first frequency or the second frequency, so as to adjust a distance between the first frequency adjustment component and the first common ground end.

3. The electronic device according to claim 1, wherein the integrated camera includes a first impedance matching unit assembled to the first metal layer, and wherein the first impedance matching unit is disposed across a portion of the first inner slot between the first open circuit opening and the first communication opening.

4. The electronic device according to claim 1, wherein the electronic device is a notebook computer further including an input host, and wherein the display is pivotally connected to the input host through the second long edge.

5. The electronic device according to claim 1, wherein the first open circuit opening is arranged adjacent to the first common ground end, and the first communication opening is arranged adjacent to the first grounding end.

6. The electronic device according to claim 5, wherein the first metal layer includes two L-shaped radiation segments in a staggered arrangement, wherein each of the two L-shaped radiation segments has a long sub-segment and a short sub-segment that is perpendicularly connected to the long sub-segment, wherein the short sub-segments of the two L-shaped radiation segments respectively have the first common ground end and the first grounding end, wherein one of the two L-shaped radiation segments having the first common ground end and the long sub-segment of another one of the two L-shaped radiation segments jointly define the first open circuit opening, and wherein one of the two L-shaped radiation segments having the first grounding end and the long sub-segment of another one of the two L-shaped radiation segments jointly define the first communication opening.

7. The electronic device according to claim 6, wherein the integrated camera further includes two three-dimensional extension segments respectively extending from the two L-shaped radiation segments in a direction away from the elongated circuit board, and wherein the two three-dimensional extension segments are spaced apart from each other at a position that corresponds to the first inner slot.

8. The electronic device according to claim 1, wherein the display includes a second signal-permeable region, and the first signal-permeable region and the second signal-permeable region are respectively arranged on two opposite sides of the first long edge, wherein the elongated circuit board has a second antenna distribution segment that is connected to another end of the camera distribution segment and that faces toward the second signal-permeable region, and the camera module has a second grounding portion, wherein the integrated camera includes:

a second frequency adjustment component connected to the second grounding portion and the grounding region;

a second metal layer formed on the second antenna distribution segment, wherein the second metal layer has a second common ground end connected to the second grounding portion and a second grounding end that is arranged away from the second common ground end, and wherein the second metal layer has a second inner slot that is arranged between the second common ground end and the second grounding end and that has a second open circuit opening and a second communication opening; and a second grounding component connected to the second grounding end and the grounding region, wherein the grounding region, the second grounding portion, the second frequency adjustment component, the second metal layer, and the second grounding component jointly define a second outer slot that is in spatial communication with the second inner slot through the second communication opening so as to jointly form a second slot antenna;

wherein the electronic device includes a second cable disposed in the display, wherein the second cable includes a second feeding wire and an second outer conductor that surrounds the second feeding wire, and wherein the second feeding wire is connected to the display and the second common ground end, and the second outer conductor is connected to the second grounding end.

9. An integrated camera of an electronic device, comprising:

an elongated circuit board having a camera distribution segment and a first antenna distribution segment that is connected to one end of the camera distribution segment;

a camera module being assembled to the camera distribution segment and having a first grounding portion;

a first frequency adjustment component connected to the first grounding portion;

a first metal layer formed on the first antenna distribution segment, wherein the first metal layer has a first common ground end connected to the first grounding portion and a first grounding end that is arranged away from the first common ground end, and wherein the first metal layer has a first inner slot that is arranged between the first common ground end and the first grounding end and that has a first open circuit opening and a first communication opening; and a first grounding component connected to the first grounding end.

10. The integrated camera according to claim 9, wherein the first frequency adjustment component is selectively connected to one of different positions of the first grounding portion so as to adjust a distance between the first frequency adjustment component and the first common ground end.

11. The integrated camera according to claim 9, further comprising a first impedance matching unit assembled to the first metal layer, wherein the first impedance matching unit is disposed across a portion of the first inner slot between the first open circuit opening and the first communication opening.

* * * * *